(12) United States Patent  
Guzenda (10) Patent No.: US 9,063,977 B2  
(45) Date of Patent: Jun. 23, 2015

(54) METHOD AND SYSTEM FOR ACCELERATION OF PATHWAY DETECTION AND RANKING WITHIN AN INFORMATION TECHNOLOGY DATABASE

(75) Inventor: Leon Guzenda, Rio Vista, CA (US)

(73) Assignee: OBJECTIVITY, INC., San Jose, CA (US)

( * ) Notice: Subject to any disclaimer, the term of this patent is extended or adjusted under 35 U.S.C. 154(b) by 822 days.

(21) Appl. No.: 12/753,835

(22) Filed: Apr. 2, 2010

(65) Prior Publication Data

US 2011/0246450 A1  Oct. 6, 2011

(51) Int. Cl.  
*G06F 7/00* (2006.01)  
*G06F 17/30* (2006.01)

(52) U.S. Cl.  
CPC .... *G06F 17/30483* (2013.01); *G06F 17/30297* (2013.01); *G06F 17/30607* (2013.01)

(58) Field of Classification Search  
None  
See application file for complete search history.

(56) References Cited

U.S. PATENT DOCUMENTS

| | | | | |
|---|---|---|---|---|
| 5,504,885 A | * | 4/1996 | Alashqur | 717/141 |
| 5,754,543 A | * | 5/1998 | Seid | 370/351 |
| 5,893,108 A | * | 4/1999 | Srinivasan et al. | 707/103 |
| 7,860,895 B1 | * | 12/2010 | Scofield et al. | 707/802 |
| 7,945,559 B2 | * | 5/2011 | Hays | 707/714 |
| 8,117,187 B2 | * | 2/2012 | Mostl | 707/716 |
| 8,176,036 B2 | * | 5/2012 | Srivastava et al. | 707/713 |
| 2006/0149712 A1 | * | 7/2006 | Kindsvogel et al. | 707/3 |
| 2006/0287981 A1 | * | 12/2006 | Meyers et al. | 707/2 |

* cited by examiner

*Primary Examiner* — James Trujillo  
*Assistant Examiner* — Cheryl M Shechtman  
(74) *Attorney, Agent, or Firm* — Patrick Reilly (57) ABSTRACT

Methods, systems and computer-readable medium for replicating the data fields used by relational join operations in transient or persistent data structures with explicit support for named relationships that may have 1:1, 1:many, many:1 or many:many cardinality. An algorithm is applied to predetermine the optional search path for finding relationships between any two rows of any of one or more tables, including relationships defined between other tables. The schema of a target relational database, either derived or input, is converted into an object-oriented schema that explicitly defines relationships between columns in the tables of the relational database and represents the tables as object classes. The schema is analyzed and optimal search paths are derived and stored for subsequent use. A query engine accesses the predefined search paths in order to execute the specific types of query listed above and incrementally populates instances of the transient or persistent structures.

25 Claims, 9 Drawing Sheets

| PW.ID.1 | OBJ.T1 | OBJ.T2 | DIR.1 | OBJ.TA | M | OBJ.TB | 1 |

← FIRST PATHWAY RECORD PW.REC.1

FIGURE 6A

| PW.ID.2 | OBJ.T1 | OBJ.T2 | DIR.0 | OBJ.TN | C1 | OBJ.TH | C2 |

← SECOND PATHWAY RECORD PW.REC.2

METHOD AND SYSTEM FOR ACCELERATION OF PATHWAY DETECTION AND RANKING WITHIN AN INFORMATION TECHNOLOGY DATABASE

FIELD OF THE INVENTION

The present invention relates generally to database management systems, and more particularly to performing searches within a database.

BACKGROUND OF THE INVENTION

The relational and object-relational models for data of information technology systems are very powerful in conventional configurations of database management systems ("DBMS"). More particularly, relational databases store data in tables, wherein each table includes at least one column and all entries within each column are of a same type. Each row of a relational database table consists of at least one column. Relationships between rows are either defined (a.) implicitly by the presence of a field with the same content in the rows, e.g. a Customer_ID field in a Customer table and also in a Product Order table, or (b.) explicitly in a separate "join" table that, for example, has rows with a Customer_ID and a Product_Order_ID in them.

Database queries can be structure to enable retrieving representations of information ("data"). In object-oriented database systems ("OODBMS") relationships between objects are expressed by object identifiers that specify an individual software object, and link attributes of the link formed when a first software object references an object identifier of a second software object.

Queries are generated and applied in a relational database using a structured query language ("SQL"). An SQL statement is a command that explicitly describes what data is to be retrieved from or stored in the relational database system as a result of the statement, but leaves up to each system the mechanisms and sequence of operations for producing the desired result. Several database management systems that accept SQL statements are commercially available at the time of this writing.

In a database management system (DBMS), data may be stored in one or more data containers. The term container is used to refer to any set of data that is processed as a set of one or more records, e.g., software objects ("objects"), each record being organized into one or more fields. In relational database systems, the containers are called "relations" or "tables," the records are referred to as "rows," and the fields are referred to as "columns," and each table has a fixed number of columns. In an object-relational database a column can be associated with an object type that is made-up of several attributes.

The prior art includes methods of searching for data related to a particular row in a relational database that require join operations that will either search a specified table for a matching row or utilize a join table. Certain prior art join operations take advantage of B-Tree indices to avoid having to scan an entire target table. Yet these prior art techniques of join operation of and join table generation are computationally intensive.

Based on the foregoing, there is a clear need for techniques to improve the efficiency of performing queries with a relational database.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

This and other objects of the present invention are made obvious in light of this disclosure, wherein embodiments of the method of the present invention are presented that overcome one or more deficiencies in the prior art by converting a schema of a relational database, either derived from the relational data dictionary or an external metadata repository, into an object-oriented schema that explicitly defines relationships between columns in the tables of the relational database and represents the tables as object classes. In another aspect of the method of the present invention, the derived object-oriented schema is analyzed and optimal search paths are derived and stored for subsequent use in performing queries. When the schema of the source relational database changes, or is altered, an updated object-oriented schema may be newly derived and the newly derived object-oriented schema is analyzed, and updated optimal search paths are derived and stored for subsequent use in performing queries.

In yet another aspect of the method of the present invention, a query engine accesses the predefined search paths in order to execute the specific types of queries and incrementally populates instances of transient or persistent structures useful in determining the probable relative efficiency of selected predefined search paths between software objects, or alternately between two object types, of the derived object-oriented schema.

In still additional aspects of the method of the present invention, data fields used by relational join operations are replicated in transient or persistent data structures with explicit support for named relationships between software objects that may have 1:1, 1:many, many:1 or many:many cardinality. The method of the present invention provides more than a trivial navigational schema; the derived object oriented schema can, for example, be built in alternate aspects to support web browser access to data in the source relational database. The method of the present invention may use algorithms to predetermine the optional search path for finding relationships between any two rows of any of one or more tables, including relationships defined between other tables.

Even other alternate preferred embodiments of the method of the present invention enable extremely fast execution of certain query types to include, but nor limited, queries of the following syntax or content types:

a) Find if any kind of path of links between one row and another row exists;

b) Find the shortest series of links between one row and another row; and c) Find all links between one row and another row.

Computer-readable media having computer-executable instructions for performing methods of componentization embody further aspects of the invention.

Alternatively, the invention may comprise various other methods and apparatuses.

Other features will be in part apparent and in part pointed out hereinafter. Still additional features and advantages of the invention will be made apparent from the following detailed description of illustrative embodiments that proceeds with reference to the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 7,519,577 (inventors: Brundage, et al.; issued on Apr. 14, 2009) titled "Query intermediate language method and system"; U.S. Pat. No. 7,562,346 (inventors Jhanwar, et al.; issued on Jul. 14, 2009) titled "Software componentization for building a software product"; U.S. Pat. No. 7,555,771 (inventors; Bransom, et al.; issued on Jun. 30, 2009) titled "System and method for grouping device or application objects in a directory service";

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
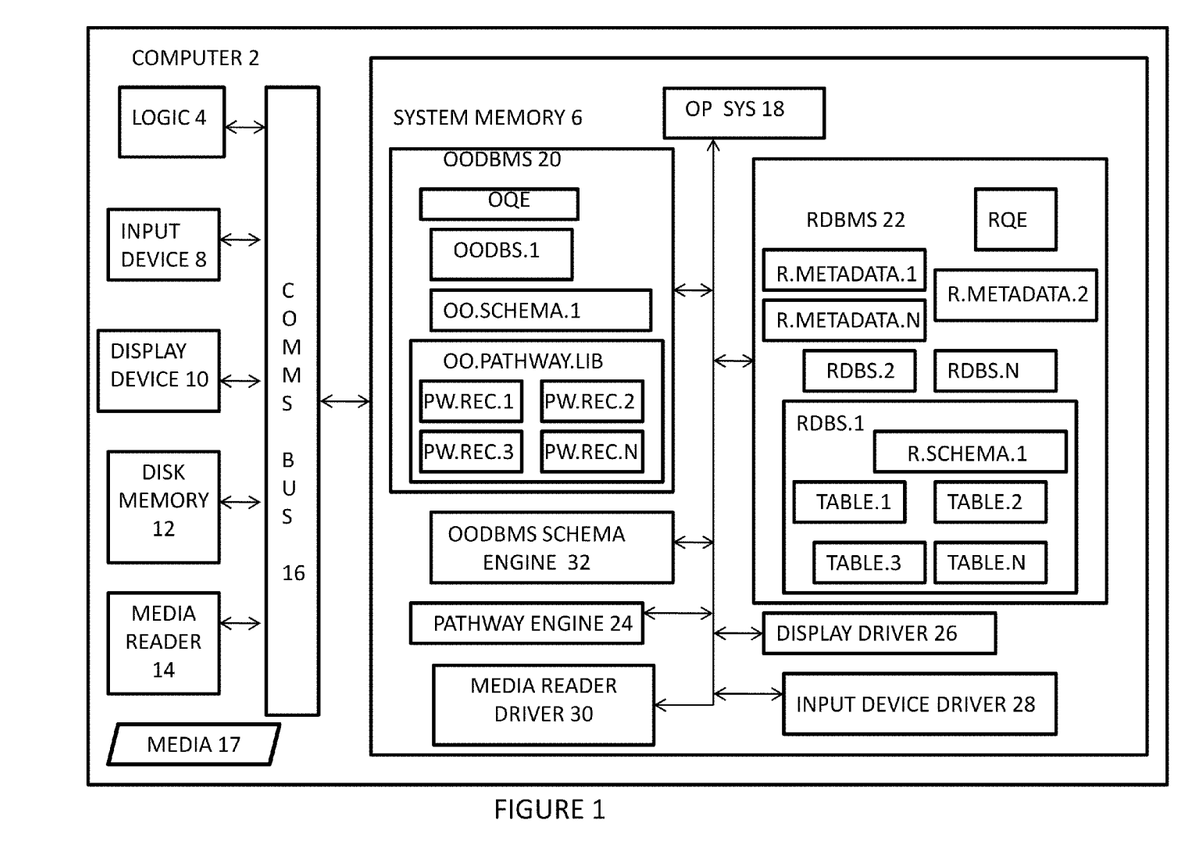
FIG. 1 is a schematic of a computer configured with a relational database management system and an object-oriented database system.

Referring now generally to the Figures and particularly to FIG. 1, FIG. 1 is a schematic of a computer 2 having a logic 4, a system memory 6, a data input peripheral 8, a display device 10, a disk memory 12, and a digital media reader 14 that are bi-directionally communicatively coupled by a communications bus 16.

The electronic media reader 14 is configured to read machine-executable instructions from a computer-readable medium 17, wherein the machine-executable instructions direct the computer 2 to perform one or more aspects or the steps of the method of the present invention.

The terms "computer-readable medium" 17 and "computer-readable media" as used herein refer to any suitable tangible medium known in the art that participates in providing instructions to the computer 2. Such a medium may take many forms, including but not limited to, non-volatile tangible media and volatile tangible media, and transmission media. Non-volatile tangible media includes, for example, optical or magnetic disks, such as may be comprised within the system memory 6 or the removable medium 17. Volatile media includes dynamic memory.

Common forms of computer-readable media 17 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer system The system memory 6 includes a plurality of software modules, including an operating system 18, an object oriented database management system ("OODBMS") 20, a relational database management system ("RDBMS") 22, a pathway engine 24, a display driver 26, an input device driver 28, and a media reader driver 30.

The computer 2 may be a may be or comprise (a.) a network-communications enabled SUN SPARCSERVER™ computer workstation marketed by Sun Microsystems of Santa Clara, Calif. running LINUX™ or UNIX™ operating system; (b.) a network-communications enabled personal computer configured for running WINDOWS XP™, VISTA™ or WINDOWS 7™ operating system marketed by Microsoft Corporation of Redmond, Wash.; (c.) a VAIO FS8900™ notebook computer marketed by Sony Corporation of America, of New York City, N.Y.; or (d.) a PowerBook G4 ™ personal computer as marketed by Apple Computer of Cupertino, Calif.

The system memory 6 including the RDBMS 22 and the OODBMS 20 may be, or comprise, or be comprised within, a federated database that might include in singularity or combination (1.) an object oriented database as marketed by Objectivity, Inc., of Sunnyvale, Calif.; (2.) an IBM DB2 Universal Database™ server (in Linux, UNIX® marketed by IBM Corporation of Armonk, N.Y.; (3.) WINDOWS™ operating system environments marketed by Microsoft Corporation of Redmond, Wash.; and/or (4.) multiple data sources to which the client query application sends queries.

The RDBMS 22 might be or include a combination of (1.) an IBM DB2 Universal Database™ server (in Linux, UNIX® marketed by IBM Corporation of Armonk, N.Y.; (2.) WINDOWS™ operating system environments marketed by Microsoft Corporation of Redmond, Wash.; and (4.) multiple data sources to which the client query application sends queries.

The RDBMS 22 includes a relational database query engine RQE, a plurality of relational databases RDBS.1-RDBS.N and optionally a plurality of relational database metadata R.METADATA.1-R.METADATA.N. As illustrated in FIG. 1 as represented by the exemplary first relational database RDBS.1, each relational database includes a plurality of tables TABLE.1-TABLE.N and an optional first relational database schema record R.SCHEMA.1. The first metadata R.METADATA.1 and or the first relational database schema record R.SCHEMA.1 may include, in whole or in part, a representation of a first relational database schema of the first relational database RDBS.1 that may be interpreted by an object-oriented database schema engine 32 to generate a first object-oriented schema OO.SCHEMA.1. The first object-oriented schema OO.SCHEMA.1 is used by the OODBMS to generate a first object-oriented database OODBS.1, wherein the first object-oriented database OODBS.1 is an object-oriented representation of the first relational database schema. Alternatively or additionally, the object-oriented database schema engine 32 may generate, in whole or in part, the first object-oriented schema OO.SCHEMA at least partly on the basis of an analysis of the first relational database RDBS.1.

A pathway engine 24 analyzes the first object-oriented schema OO.SCHEMA and generates therefrom an object-oriented pathway library OO.PATHWAY.LIB. The object-oriented pathway library OO.PATHWAY.LIB contains a plurality of pathway records that each indicate a pathway found between two object classes of the first object-oriented schema OO.SCHEMA.

Figure 2:
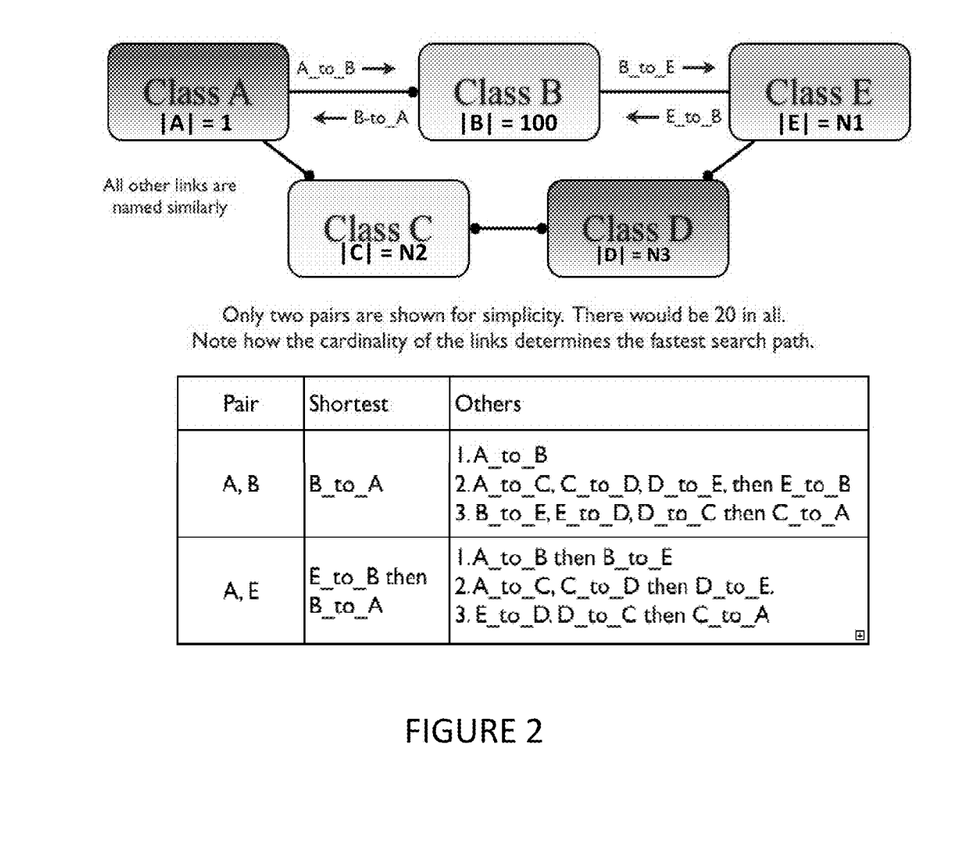
FIG. 2 is a diagrammatic representation of certain object classes of the object-oriented database system of FIG. 1.

Referring now generally to the Figures and particularly to FIG. 2, FIG. 2 is a diagrammatic representation of certain object classes A, B, C, D & E of the first object-oriented schema OO.SCHEMA linked together with relationships whose cardinality is indicated in FIG. 2 by the presence or absence of a filled circle, where a circle at the end of each connection denotes a "1: Many" or "Many: Many" association. For example, the relationship A_to_B has cardinality 1-to-many and the relationship B_to_A has cardinality many-to-1.

FIG. 2 illustrates the shortest links, i.e., least links to be explored, and other paths between two pairs of object classes, for example {A, B} and {A, E}. Consider a database with exactly one instance of an object of class A, designated A1, connected to 100 instances of class B, designated {B1, B2, B3 . . . B100}. When the analytic goal is to determine whether the object instance A1 is connected to object instance B100, it might take 100 link traversals {A1 to B1, A1 to B2, A1 to B100} to determine whether or not they are linked via relationship A_to_B. However, reversing the direction of the search, from {B100 to A1}, produces a result in one link traversal. That is the key to the search path map algorithm of certain aspects of the method of the present invention: finding a route through the first relational database RDBS.1 that uses as few many-to-many and one-to-many links of the derived first object-oriented schema OO.SCHEMA as possible.

Figure 3:
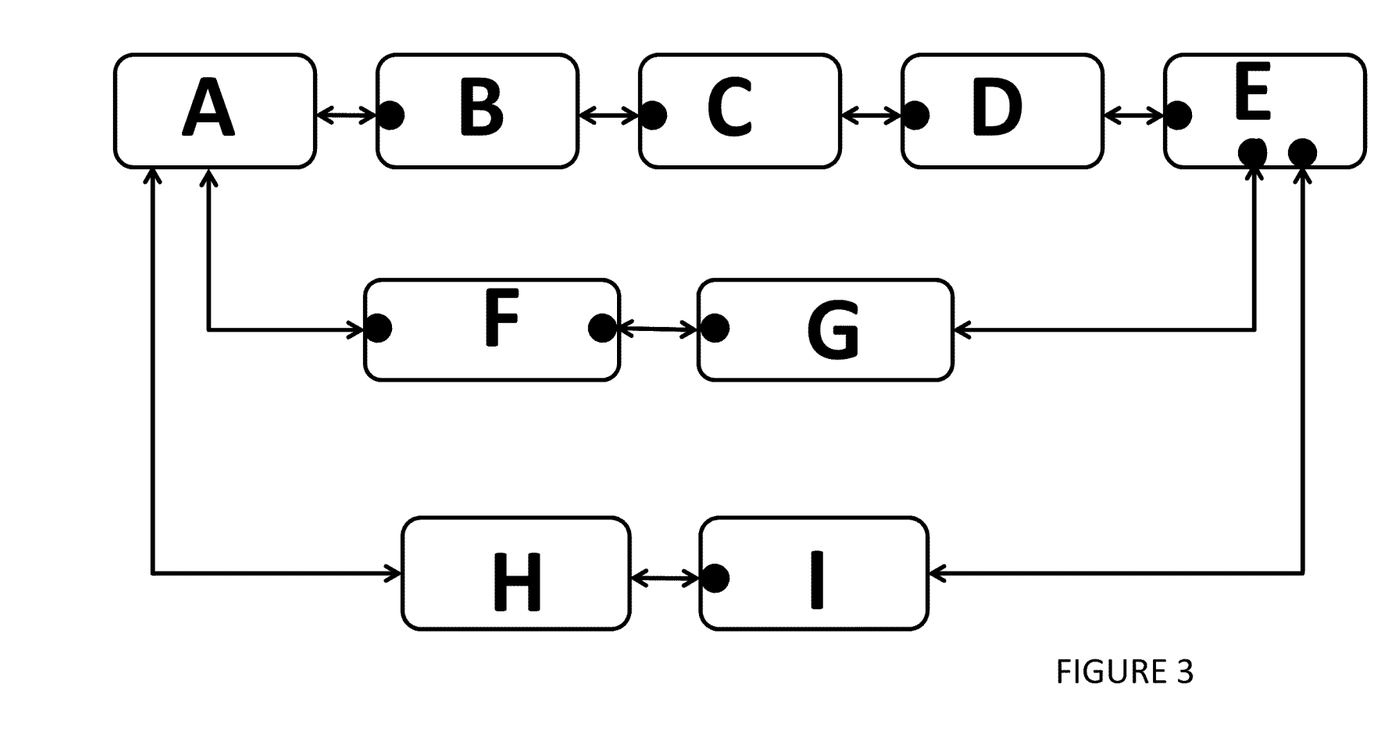
FIG. 3 is a representation of a search algorithm that works by finding all possible paths between pairs of objects of the object-oriented database system of FIG. 1 and then classifying the links according to their cardinality.

Referring now generally to the Figures and particularly to FIG. 3, FIG. 3 is a representation of a search algorithm that works by finding all possible paths between pairs of objects and then classifying the links according to their cardinality. Relationships of cardinality between each group are indicated in FIG. 3 by the presence or absence of a filled circle, where a circle at the end of each connection denotes a "1: Many" or "Many: Many" association. In the example of FIG. 3, six pathways are found between the Object Class A and an Object Class E of the first object-oriented schema OO.SCHEMA, and each pathway has a directionality or either from Class A to Object E, or from Class E to Object Class A.

A Pairing One describes a first pathway from Object Class A through Object Classes B, C and D and to Object Class E. This Pairing One includes four one-to-many type links. Conversely, a Pairing Two describes a second search pathway from Object Class E through Object Classes D, C and B and to Object Class A. This Pairing Two is thus shown to include four many-to-one type links, and thus indicates a more efficient search pathway than Pairing One.

A Pairing Three describes a third pathway from Object Class A through Object Classes F and G and to Object Class E. This Pairing Three includes two one-to-one type links and one many-to-many type link. Conversely, a Pairing Four describes a fourth search pathway from Object Class E through Object Classes G and F and to Object Class A. This Pairing Four is thus shown to include two one-to-one type links and one many-to-many type links, and thus indicates a more efficient search pathway than Pairing Three or Pairing One, but not as efficient as Pairing Two.

A Pairing Five describes a fifth pathway from Object Class A through Object Classes H and I and to Object Class E. This Pairing Five includes one, one-to-one link types and two one-to-many link types. Conversely, a Pairing Six describes a sixth search pathway from Object Class E through Object Classes H and I and to Object Class A. This Pairing Six is thus shown to include one, one-to-one link type and two many-to-one type links, and thus indicates a more efficient search pathway than Pairing One, Pairing Two, Pairing Three, Pairing Four and Pairing Five.

Table One below presents the analysis of the six pathways of FIG. 3.

TABLE 1

1. A->B->C->D->E     4 links     MMMM
// M indicates a 1:Many link type; and a 1 indicates a 1:1 or Many:1 link type.
2. E->D->C->B->A     4 links     1111
// Pathway 2 is more efficient than Pathway 1.

TABLE 1-continued

```
3. A->F->G->E                                    3 links        MMM
// Pathway 3 is more efficient than Pathway 1 and Pathway 2,
but is probably slower than Pathway 2.
4. E->G->F->A                                    3 links        1M1
// Pathway 4 is more efficient than Pathway 1 or Pathway 3,
but may be less efficient than Pathway 2.
5. A->H->I->E                                    3 links        1MM
// Pathway 5 is the same as Pathway 4 in link count, but is less efficient.
6. E->I->H->A                                    3 links        111
// Pathway 6 has same number of links as Pathway 4 and Pathway 5
but is most efficient.
```

The computer's 2 relational database RDBS.1 of FIG. 1 creates tables TABLE.1-TABLE.N of ordered pathways between requested nodes. These tables TABLE.1-TABLE.N order the pathways in accordance to efficiency.

Figure 4:
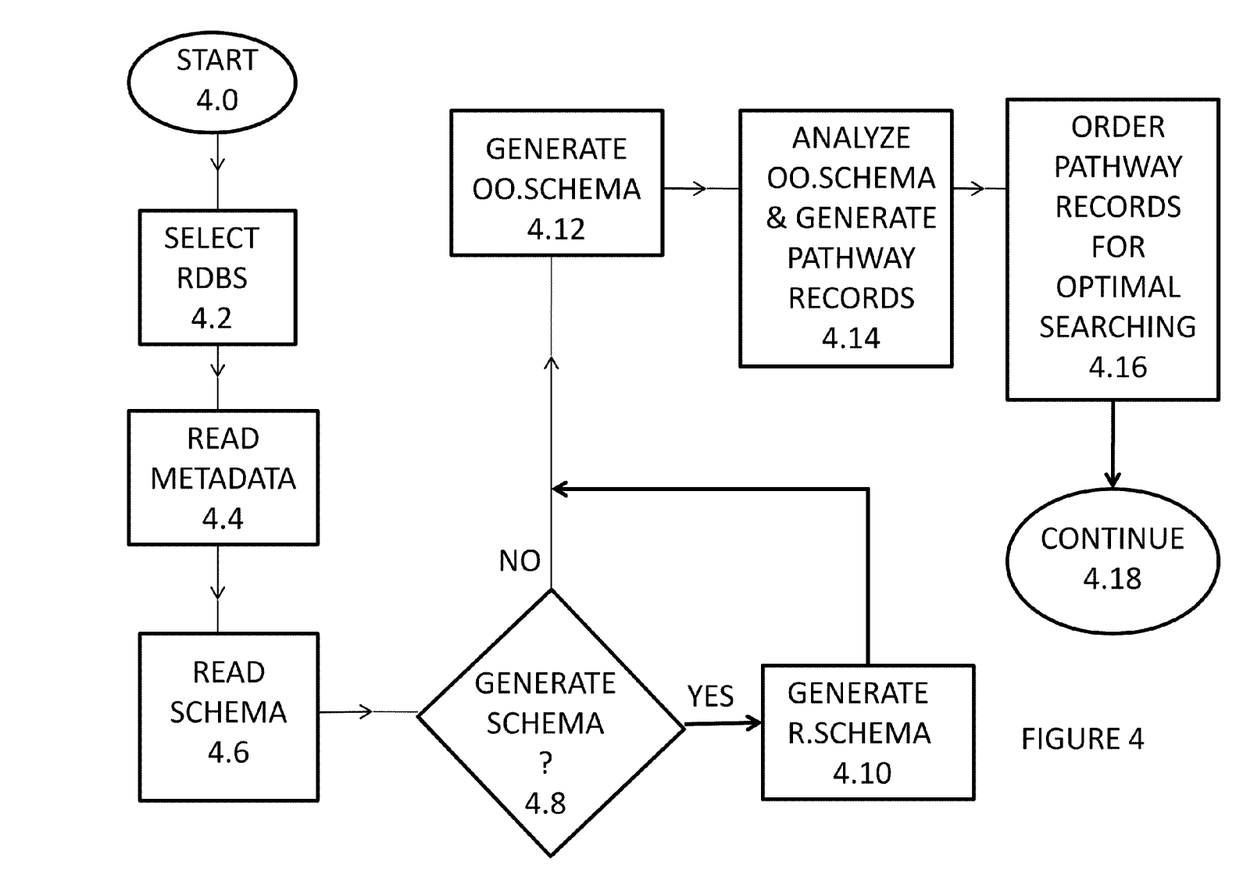
FIG. 4 is a flow chart of a first process of the computer of FIG. 1, wherein an object-oriented schema is generated from a relational database schema of the relational database system of FIG. 1.

Referring now to FIG. 4, FIG. 4 is a flow chart of a first process of the computer 2, wherein an object-oriented schema is generated from a relational database schema. In step 4.2 a relational database is selected by a user or by an automated process of the system software of the computer 2. In step 4.4 the computer 2 reads some or all of the schema of the selected relational database from a metadata of the selected relational database. Alternatively or additionally, in step 4.6 the computer 2 reads some or all of the schema of the selected relational database as stored within a selected relational database schema record R.SCHEMA.1 of the selected relational database RDBS.1. Still optionally, additionally or alternatively the computer 2 determines in step 4.8 whether to generate some or all of the relational database schema, from which determination the computer 2 may proceed on to step 4.10 and to analyze the selected relational database and to generate all or some of the schema of the selected relational database RDBS.1.

The computer object-oriented database schema engine 32 in step 4.12 and derives a first object-oriented schema OO.SCHEMA.1 from the schema of the selected relational database wherein the tables of the selected relational database are represented as object classes and relationships between columns of tables of the selected relational database are defined within the first object-oriented schema OO.SCHEMA.1. The computer 2 then analyzes the object-oriented schema derived in step 4.14, determines the pathways between the object classes and generates a pathway record PW.REC describing each discovered pathway. The pathway records PW.REC are then ordered in step 4.16 by the computer to indicate which search pathways are more likely to provide efficient results in a search process. According to certain alternate aspects of the method of the present invention, the user may alter the order of the pathway records. The pathway records PW.REC are further stored in the pathway library OO.PATHWAY.LB of the system memory of FIG. 1. The computer proceeds from step 4.16 to step 4.18 and to perform alternate computational processes.

Figure 5:
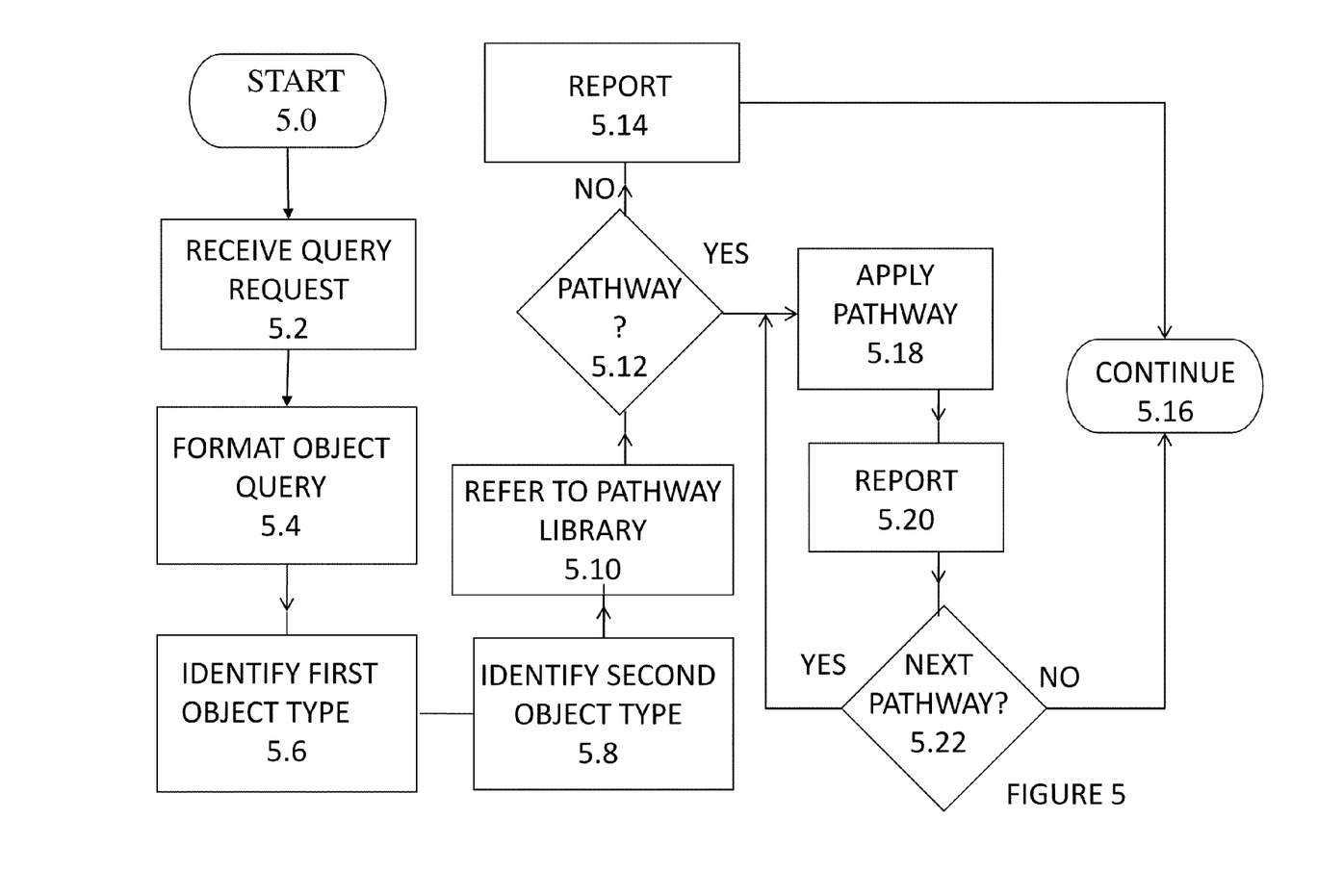
FIG. 5 is a flow chart of a second process of the computer of FIG. 1, wherein search pathways are selected and applied in accordance with certain aspects of the method of the present invention.

Referring now to FIG. 5, FIG. 5 is a flow chart of a second process of the computer 2, wherein search pathways are selected and applied in accordance with certain aspects of the method of the present invention. In step 5.2 the computer 2 receives either an automated query request or a query request from a user to perform a search query. The query request relates to information stored in the first relational database RDBS.1. In step 5.4 the computer interprets the query received in step 5.2 in accordance with the derived first object-oriented schema OO.SCHEMA.1 and format a query applicable by the object-oriented query engine OQE. In the step 5.6 the computer identifies a first object and object type of the query and in step 5.8 the computer 2 identifies a second object type of the query. The computer applies the object-oriented query engine OQE in step 5.10 to the pathway records of the pathway library OO.PATHWAY.LIB in step 5.10 and determines in step 5.12 whether any pathway record exists that indicates the existence of a pathway between object types identified in steps 5.6 and 5.8. Where no relevant pathway record is found in step 5.12, the computer proceeds on to step 5.14 and to report this finding, and therefrom on to step 5.16 to perform alternate computational processes. Where at least one relevant pathway record is found in step 5.12, the computer proceeds on from step 5.12 to step 5.18, wherein the object-oriented query engine applies a first selected relevant pathway with the query of step 5.18. The computer in step 5.20 stores and reports the results of the query action of step 5.18 and proceeds onto step 5.22 to determine whether any additional relevant pathway records are stored within the pathway library OO.PATHWAY.LIB. When an additional relevant pathway record is found in step 5.22, the computer applies the additional relevant pathway record in another execution of the process loop of steps 5.18, 5.20 and 5.22. When an additional relevant pathway record is not found in step 5.22, the computer proceeds therefrom on to step 5.16 to perform alternate computational processes.

Figure 6A:
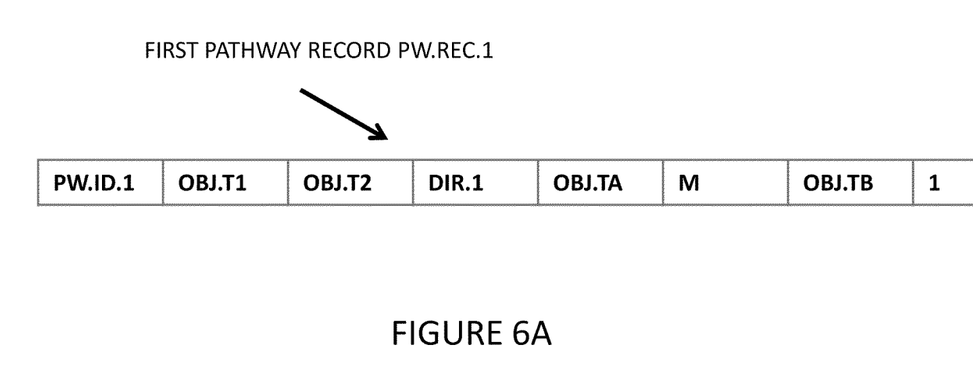
FIGS. 6A and 6B are schematics pathway records of the object-oriented database system of FIG. 1.
Figure 6B:
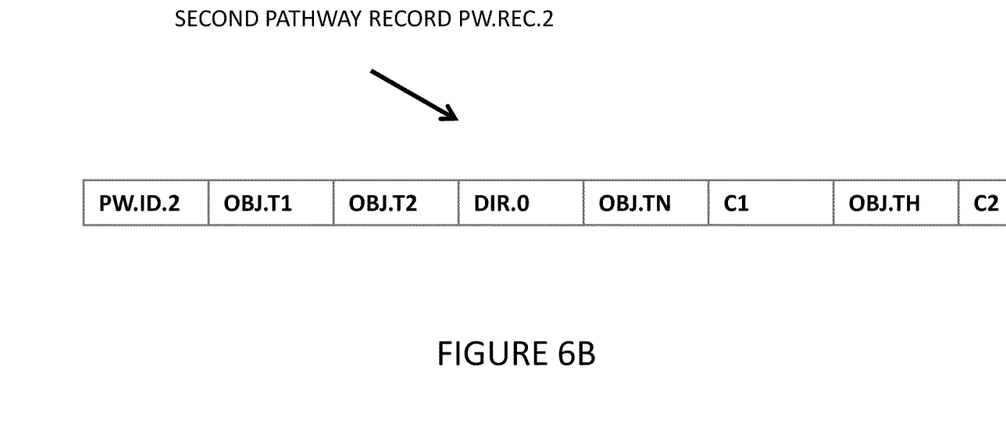

Referring now to FIGS. 6A and 6B, FIG. 6A is schematic of a first search pathway record PW.REC.1 and FIG. 6B is a schematic of a second search pathway record PW.REC.2. The first pathway record PW.REC.1 includes a first record identifier PW.ID.1 that uniquely identifies the first pathway record PW.REC.1 within the computer. The first pathway record PW.REC.1 further includes a first query object type OBJ.T1 and a second query type OBJ.T2. The directionality of a first pathway formed between the first query object type OBJ.T1 and the second query type OBJ.T2 may be indicated by the syntax of the first pathway record PW.REC.1, or alternatively or additionally by a directionality indicator DIR.1. The first pathway record PW.1 additionally includes one or a plurality of object types identifiers OBJ.TA-OBJ.TN and associated cardinalities M and 1. Each object type identifier OBJ.TA-OBJ.TN referenced in the first pathway record PW.REC.1 relates to an object found within the first pathway that connects the first query object type OBJ.T1 and the second query type OBJ.T2. The associated cardinality of each object type OBJ.TA-OBJ.TN stored within the first pathway record PW.1 is dependent upon the directionality of the pathway as identified by the syntax of the first pathway record PW.REC.1 and/or the directionality indicator DIR.1.

The value M indicates that according to the directionality DIR.1 of the first pathway record PW.REC.1, that the cardinality of the relation ship between the first object OBJ.T1 to the next object OBJ.TA is classed as a One-to-Many or a Many-to-Many Cardinality.

Referring now to FIG. 6B, the second pathway record PW.REC.2 includes a second record identifier PW.REC.2 that uniquely identifies the second pathway record PW.2 within the computer. The second pathway record PW.REC.2 further includes a first cardinality C1 associated with a type N object type OBJ.TN and a second cardinality value C2 associated with a type H object type OBJ.TH. The first cardinality value C1 and/or the second cardinality value C.2 may be provided to the computer by a user, or derived by the computer from an analysis of the first object-oriented schema OO.SCHEMA.1.

Figure 7:
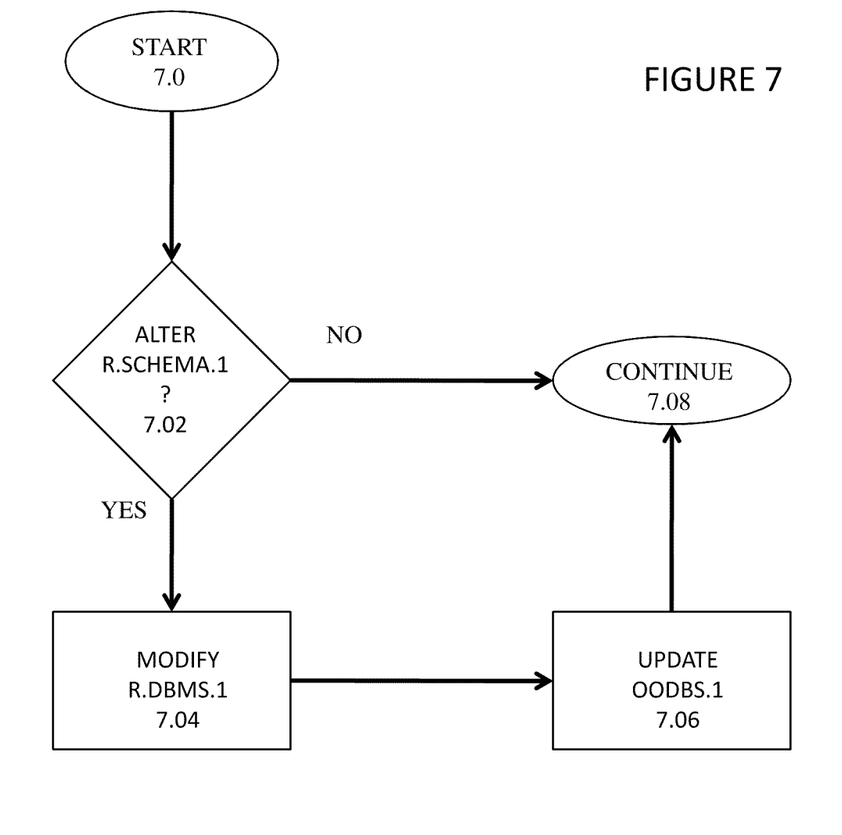
FIG. 7 is a flow chart of an additional optional process of the computer of FIG. 1, wherein the computer updates a relational database schema and an object-oriented database schema.

Referring now to FIG. 7, FIG. 7 is a flow chart of an additional optional process of the computer, wherein the computer determines in step 7.02 whether a command to the first relational database RDBS.1 has been received either from a user or generated by an alternate process. When the computer determines in step 7.02 that the first relational database schema shall be altered, the computer proceeds from step 7.02 to step 7.04 to modify the first relational database RDBS.1 according to the schema update command of step 7.02, and to update the first relational schema record R.SCHEMA.1 to reflect the modification performed in accordance with update command of step 7.02. The computer 2 proceeds from step 7.04 to step 7.06 to update the associated derived first object-oriented database OODBS.1 by application of the object-oriented schema engine OO.SCHEMA ENGINE with the updated first relational schema record R.SCHEMA.1. The computer 2 proceeds from either step 7.02 or step 7.06 to step 7.08 and to perform alternate computational processes.

Figure 8:
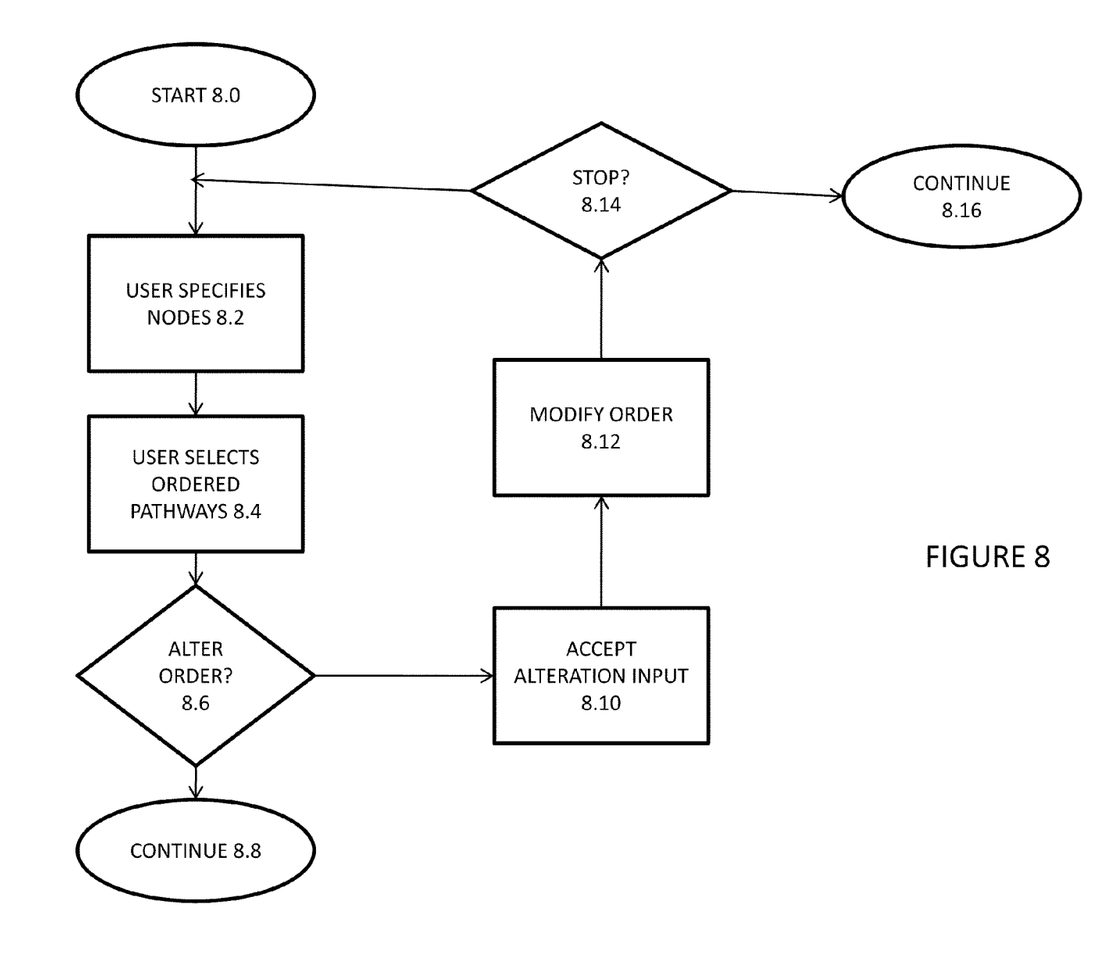
FIG. 8 is a flow chart of an optional process wherein a human user may alter the order of rendered pathways.

Referring now to FIG. 8, FIG. 8 is a flow chart of an optional process wherein a human user may alter the order of rendered pathways. Beginning with step 8.2, using the input device 8 a user specifies multiple nodes in which said user wishes to have database pathways constructed. This information is displayed to the user through a display device 10. The computer 2, using the pathway engine 24, then generates tables TABLE.1 which pathways between nodes are ordered by efficiency. The TABLE.1 comprises a plurality of pathway records PW.REC.1-PW.REC.N in an order of application in a search process. The user then selects one or more of these pathways (step 8.4). The user optionally can be given a choice to alter the ordering of these pathways (8.6) to affect the order in which each pathway record PW.REC.1-PW.REC.N is applied in a search operation, e.g., in response to a query command. Should the user choose not to alter the order of the pathways, the computer 2 continues with other processes (step 8.8). If the user decides to alter the order of the pathways, the user then uses the input device 8 once again and alters the order to user specified preferences (step 8.10). The computer 2 then reorders the pathways to suit user requests (step 8.12). The user can direct the computer 2 at step 8.14 to reorder an order of pathway records PW.REC.1-PW.REC.N multiple times and thereby repeat in process loop 8.2-8.14.

Figure 9:
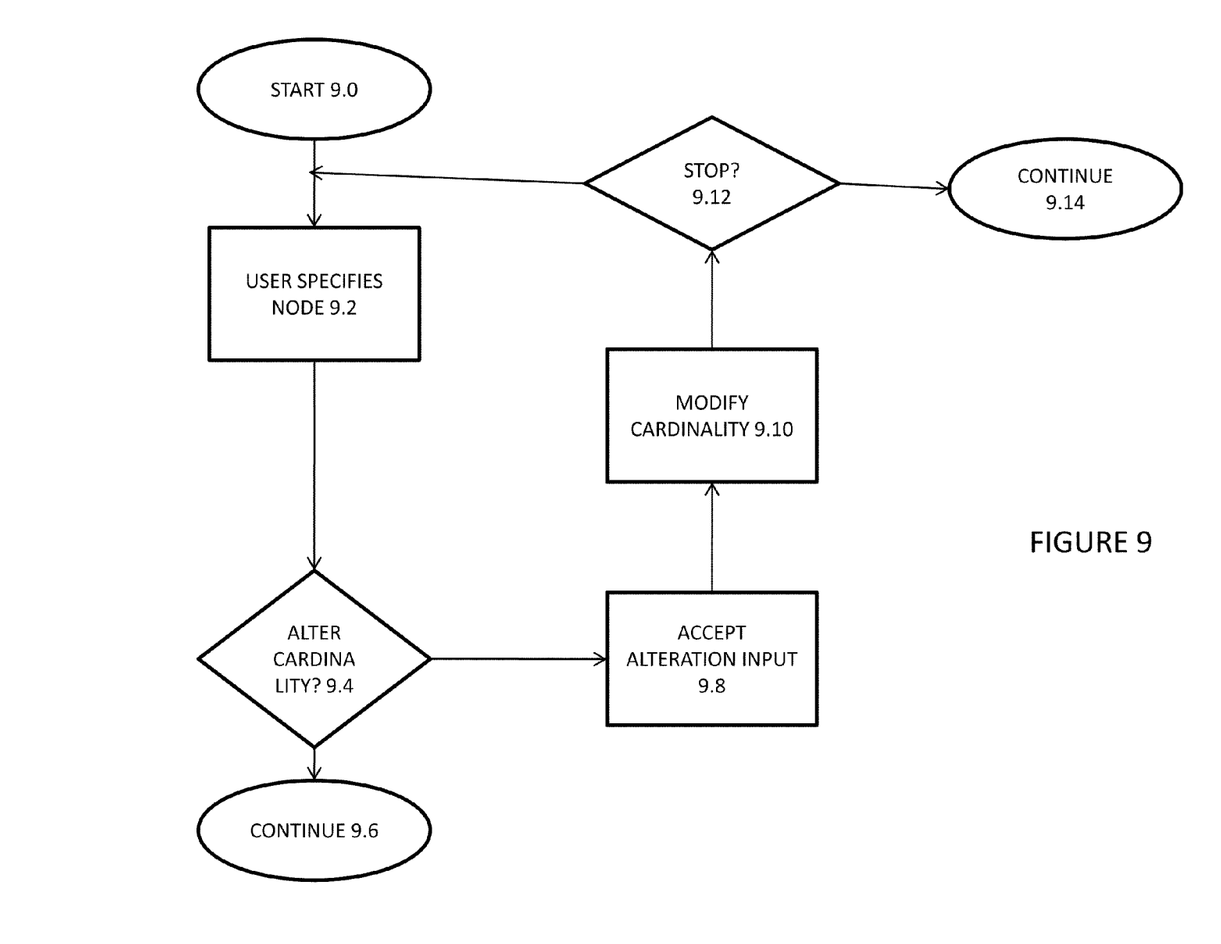
FIG. 9 is a flow chart of an optional process wherein a human user may alter the order of rendered pathways.

Referring now to FIG. 9, FIG. 9 is a flow chart of an optional process wherein a human user may alter the cardinality of a specified node or group/class. Beginning with step 9.2, using the input device 8 a user specifies a node in which said user wishes to view the cardinality of as recorded within a password record PW.REC.1-PW>REC.N. This information is displayed to the user through a display device 10. The user optionally can be given a choice to alter the cardinality of order of the selected node (9.4) within a pathway record PW.REC.1-PW.REC.N. Should the user choose not to alter the cardinality of the node, the computer 2 continues with other processes (step 9.6). If the user decides to alter the cardinality of the selected node, the user then uses the input device 8 once again and alters the order to user specified preferences (step 9.8) in the pathway record PW.REC.1-PW.REC.N step 9.2. The computer 2 then alters the node cardinality in the pathway record PW.REC.1-PW.REC.N step 9.2 to suit user requests (step 9.10). The user can direct the computer 2 at step 9.12 to perform the operation of pathway objects/nodes multiple times and thereby repeat in process loop 9.2-9.12.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

The invention claimed is:

1. A computer-implemented method comprising:
   a. Generating an object-oriented schema from a relational database management system, the relational database management system providing a database comprising a plurality of tables, each table having multiple columns and rows;
   b. Implementing at least one modification of at least one association between at least two object types of the object-oriented schema, whereby a human analyst directs a deletion, insertion, or modification of at least one relationship between the at least two object types of the object oriented schema;
   c. Analyzing a plurality of object class associations of the object-oriented schema to determine a plurality of semantically legitimate search pathways that link rows in one table with rows in the same or another table;
   d. Ranking each of the plurality of search pathways for expected computational efficiency in view of a cardinality of at least one link between table rows; and
   e. Providing the plurality of search pathways to a query engine in accordance with the expected computational efficiency ranking.

2. The method of claim 1, further comprising generating a record of the search pathways.

3. The method of claim 1, wherein the object-oriented schema is updated upon an alteration of a relational database schema of the relational database.

4. The method of claim 3, further comprising:
   a. Re-analyzing the updated object-oriented schema to determine an updated plurality of new search pathways that are semantically legitimate;
   b. Generating an updated ranking of the updated plurality of new search pathways for expected computational efficiency; and
   c. Providing the updated plurality of new search pathways to a query engine in an ordering in accordance with the updated ranking.

5. The method of claim 4, further comprising a modification of the ordering of the updated plurality of new search pathways by a human administrator.

6. The method of claim 4, further comprising ordering the updated plurality of new search pathways by ranking search pathways having more than one one-to-one link types between two pathway nodes of a comprising pathway, whereby pathways having more one-to-one link types are ordered for earlier examination than pathways having equal link type counts and fewer one-to-one link types.

7. The method of claim 4, further comprising ordering the updated plurality of new search pathways by ranking search pathways in view of any finding of each individual pathway having one or more many-to-one link types between pathway nodes, whereby pathways having at least one many-to-one link type are ordered for earlier examination than pathways having equal link type counts and no many-to-one link types.

8. The method of claim 7, further comprising a modification of ordering of the plurality of new search pathways by a human administrator.

9. The method of claim 7, further comprising ordering the plurality of search pathways by ranking pathways having more than one many-to-one link types between pathway nodes, whereby pathways having more many-to-one link types are ordered for earlier examination than pathways having equal link type counts and fewer many-to-one link types.

10. The method of claim 1, wherein the plurality of search pathways is stored externally from the relational database management system and made available for later access.

11. The method of claim 1, wherein the search pathway ranking is modified at least partially on the basis of a cardinality of at least one node.

12. The method of claim 1, wherein the search pathway ranking is modified at least partially on the basis of a cardinality of at least one link type or actual instances of the at least one link type.

13. A computer-implemented method comprising:
   a. Identifying a type of start node and a type of end node of a relational database system, the relational database system comprising a query engine and a relational database having a plurality of node types and a plurality of link types;
   b. Determining a plurality of search pathways from each start node type to the end node type;
   c. Counting the link types between node types of each of the plurality of search pathways;
   d. Ranking the plurality of search pathways in order of fewest link types per search pathway to most link types per pathway and in consideration of a cardinality of at least one link type, and by ranking search pathways having at least one one-to-one link types between two pathway nodes of a comprising search pathway, whereby search pathways having at least one one-to-one link types are ranked for earlier examination than search pathways having equal link type counts and fewer one-to-one link types; and
   e. Providing accessibility to the ranking of each search pathway to the query engine.

14. The method of claim 13, further comprising examining a highest ranked search pathway of the plurality of search pathways for start nodes and end nodes that comprise information that satisfies a query generated by the query engine.

15. The method of claim 13, wherein the ranking of the plurality of search pathways is modified by a human administrator.

16. The method of claim 13, further comprising ranking the plurality of search pathways by ranking search pathways having at least one many-to-one link types between pathway nodes, whereby search pathways having more many-to-one link types are ranked for earlier examination than search pathways having equal link type counts and no many-to-one link types.

17. The method of claim 13, wherein the search pathway ranking is modified at least partially on the basis of a cardinality of at least one node.

18. The method of claim 13, wherein the search pathway ranking is modified at least partially on the basis of a cardinality of at least one link type.

19. A tangible, non-transitory computer-readable media comprising machine-readable instructions that direct a computational system to execute the method comprising:
   a. Generating an object-oriented schema from a relational database schema;
   b. Analyzing the object-oriented schema to determine a plurality of search pathways that link rows in one table with rows in the same or another table;
   c. Ranking each of the plurality of search pathways for expected computational efficiency in view of a cardinality of at least one link type between table rows; and
   d. Providing the search pathways to a query engine in accordance with the expected computational efficiency ranking.

20. A computer-implemented method comprising:
   a. Identifying a type of start node and a type of end node of a relational database system, the relational database system comprising a query engine and a relational database having a plurality of node types and a plurality of link types;
   b. Determining a plurality of search pathways from each start node type to the end node type;
   c. Counting the link types between node types of each of the plurality of search pathways;
   d. Ranking the plurality of search pathways in order of fewest link types per search pathway to most link types per pathway and in consideration of a cardinality of at least one link type, and by ranking search pathways having at least one many-to-one link types between pathway nodes, whereby search pathways having more many-to one link types are ranked for earlier examination than search pathways having equal link type counts and no many-to-one link types; and
   e. Providing accessibility to the ranking of each search pathway to the query engine.

21. The method of claim 20, further comprising examining a highest ranked search pathway of the plurality of search pathways for start nodes and end nodes that comprise information that satisfies a query generated by the query engine.

22. The method of claim 20, wherein the ranking of the plurality of search pathways is modified by a human administrator.

23. The method of claim 20, further comprising ranking the plurality of search pathways by ranking search pathways having at least one one-to-one link types between two pathway nodes of a comprising search pathway, whereby search pathways having at least one one-to-one link types are ranked for earlier examination than search pathways having equal link type counts and fewer one-to-one link types.

24. The method of claim 20, wherein the search pathway ranking is modified at least partially on the basis of a cardinality of at least one node.

25. The method of claim 20, wherein the search pathway ranking is modified at least partially on the basis of a cardinality of at least one link type.

* * * * *